United States Patent
Goldberg et al.

(10) Patent No.: US 7,904,512 B2
(45) Date of Patent: Mar. 8, 2011

(54) METHODS AND SYSTEMS FOR COMPUTER BASED COLLABORATION

(75) Inventors: David E. Goldberg, Champaign, IL (US); Michael E. Welge, Champaign, IL (US); Xavier F. Llorà, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 725 days.

(21) Appl. No.: 11/119,636

(22) Filed: May 2, 2005

(65) Prior Publication Data
US 2005/0276479 A1 Dec. 15, 2005

Related U.S. Application Data

(60) Provisional application No. 60/578,688, filed on Jun. 10, 2004.

(51) Int. Cl.
*G06F 17/00* (2006.01)
*G06F 15/18* (2006.01)
(52) U.S. Cl. .......... 709/204; 709/236; 709/229; 707/204
(58) Field of Classification Search .................. 709/229, 709/218, 204; 707/204
See application file for complete search history.

(56) References Cited

U.S. PATENT DOCUMENTS

| | | | |
|---|---|---|---|
| 5,930,762 A | 7/1999 | Masch | 705/7 |
| 5,940,816 A | 8/1999 | Fuhrer et al. | 706/13 |
| 5,963,902 A | 10/1999 | Wang | 704/243 |
| 6,490,572 B2 | 12/2002 | Akkiraju et al. | 706/19 |
| 6,615,205 B1 | 9/2003 | Cereghini et al. | 707/3 |
| 6,768,973 B1 | 7/2004 | Patel | 703/2 |
| 7,146,381 B1 * | 12/2006 | Allen et al. | 707/104.1 |
| 2003/0115192 A1 * | 6/2003 | Kil et al. | 707/3 |
| 2003/0182439 A1 * | 9/2003 | Geshwind | 709/236 |
| 2005/0005232 A1 * | 1/2005 | Gosby | 715/500 |

OTHER PUBLICATIONS

Goldberg. D.E., Sastry K., and Ohsawa Y., "Discovering Deep Building Blocks for Competent Genetic Algorithms Using Chace Discovery via KeyGraph.." (2003) pp. 1-23.*
Oshawa, Y. "KeyGraph: Automatic indexing by co-occurrence graph basd on building construction metaphor." (1998) pp. 12-18.*
Goldberg, D. E., "Genetic Algorithms in Search, Optimization & Machine Learning," Addison Wesley Longman, Inc., 1989.
Goldberg, D. E., "The Design of Innovation: Lessons from and for Competent Genetic Algorithms," Kluwer Academic Publishers, 2002.
Goldberg, D. E., (1993a). "Making genetic algorithms fly: A lesson from the Wright brothers." *Advanced Technology for Developers*, 2, 1-8.

(Continued)

*Primary Examiner* — Jeffrey Pwu
*Assistant Examiner* — Sulaiman Nooristany
(74) *Attorney, Agent, or Firm* — Greer, Burns & Crain Ltd.

(57) ABSTRACT

An exemplary method for computer based collaboration between a plurality of participants communicating over a data network comprises steps of receiving communications data with the computer, using a text analysis tool to identify at least a plurality of k-words from the communications data and a plurality of relations linking at least a portion of the plurality of k-words, and displaying the k-words and relations to the plurality of participants over the computer network.

28 Claims, 6 Drawing Sheets

OTHER PUBLICATIONS

Ohsawa, Y., Benson, N. E., & Yachida, M., (1998) "KeyGraph: Automatic indexing by co-occurrence graph based on building construction metaphor." In *Proceedings of Advances in Digital Libraries*, pp. 12-18.

Takama, Y., & Hirota, K. (2000). "Discovery of topic distribution through WWW information retrieval process." *Proceedings of 2000 IEEE International Conference on Industrial Electronics, Control and Instrumentation*, 1644-1647.

Bingham, E., Kaban, A., & Girolami, M., (2003). "Topic identification in dynamical text by complexity pursuit." *Neural Processing Letters*, 17(1), 69-83.

Graetz, K., Barlow, C., Proulx, N., & Pape, L. (1997). "Facilitating idea generation in computer-based teleconferences," *Proceedings of the International ACM SIGGROUP Conference on Supporting Group Work (GROUP '97)*, 317-324.

Santanem, E., Briggs, R., & de Vreede, G. J., (2000). "The Cognitive Network Model of Creativity: a New Casual Model for Creativity and a New Brainstorming Technique," *Proceedings of the 33rd Annual Hawaii International Conference on System Sciences*, 2004.

Santanem, E., Briggs, R., & de Vreede, G.-J., (2002). "Toward an Understanding of Creative Solution Generation," *Proceedings of the 35th Annual Hawaii International Conference on System Sciences*, 2899-2908.

Goldberg, D.E., Sastry K., and Ohsawa Y., "Discovering Deep Building Blocks for Competent Genetic Algorithms Using Chance Discovery via KeyGraphs," (2003) pp. 1-23.

Goldberg, D. E., (1993b). "A Wright-brothers theory of genetic algorithms flight." *Systems, Control, and Information*, 37(8), 450-458.

Kosorukoff, A., & Goldberg, D. E. (2002). "Evolutionary computation as a form of organization." *Proceedings of the Genetic and Evolutionary Computation Conference (GECCO 2002)*, 965-972.

Takagi, H. (2001). "Interactive evolutionary computation: Fusion of the capabilities of EC optimization and human evaluation." *Proceedings of the IEEE*, 89(9), 1275-1296.

Welge, M. E., Auvil, L., Shirk, A., Bushell, C., Bajcsy, P., Cai, D., Redman, T., Clutter, D., Aydt, R., & Tcheng, D., (2003). *Data to Knowledge (D2K)* (Automated Learning Group Technical Report). Urbana, IL: National Center for Supercomputing Applications, University of Illinois at Urbana-Champaign.

Altus, S., Kroo. I., & Gage, P., *A Genetic Algorithm for Scheduling and Decomposition of Multidisciplinary Design Problems*, ASME Journal of Mechanical Design, vol. 118, Dec. 1996.

Harik, G., *Linkage learning via probabilistic modeling in the ECGA*. IlliGAL TR-99010, University of Illinois at Urbana-Champaign. Urbana, IL, 1999.

Lutz, R., *Recovering High-Level Structure of Software Systems Using a Minimum Description Length Principle*, R.F.E. Proceedings of the 13th Irish International Conference, Artificial Intelligence and Cognitive Science (AICS 2002), Sep. 2002.

Munemoto, M., & Goldberg, D.E., *Liknage Identification by Non-monotonocity Detection for Overlapping Functions*. IlliGAL Report No. 99005, Genetic and Evolutionary Computation Conference (GECCO-99), vol. 1, 1999.

Pelikan, M., Goldberg, D.E., & Cantú-Paz, E., *BOA: The Bayesian optimization algorithm*. Proceedings of the Genetic and Evolutionary Computation Conference (GECCO-99), vol. 1, pp. 525-532. Also IlliGAL TR-99003, University of Illinois at Urbana-Champaign, 1999.

Rogers. J. L., *DeMAID/GA User's Guide-Design Manager's Aid for Intelligent Decomposition With a Genetic Algorithm*, NASA TM-110241, Apr. 1996.

Salman. A., Mehrota, K., & Mohan, C., *Linkage Crossover for Genetic Algorithms*, Proceedings of the Genetic and Evolutionary Computation Conference (GECCO-99), vol. 1, pp. 564-571, 1999.

Smith, J. *On Appropriate Adaptation Levels for the Learning of Gene Linkage*. Journal of Genetic Programming and Evolvable Machines, vol. 3, No. 2, pp. 129-155, 2002.

Goldberg, D.E., Deb, K., Kargupta, H., Harik, G.: *Rapid, accurate optimization of difficult problems using fast messy genetic algorithms*. Proceedings of the Fifth International Conference on Genetic Algorithms pp. 56-64 (1993).

Ohsawa, Y. (2002). Chance discoveries for making decisions in complex real world. *New Generation Computing*, 20(2), 143-163.

Ohsawa, Y., & Nara, Y. (2002). Understanding Internet users on double helical model of chance-discovery process. In *Proceedings of the 2002 IEEE International Symposium on Intelligent Control*. pp. 844-849.

\* cited by examiner

METHODS AND SYSTEMS FOR COMPUTER BASED COLLABORATION

PRIORITY CLAIM

The present application claims priority on U.S. Provisional Application No. 60/578,688 filed on Jun. 10, 2004.

STATEMENT OF GOVERNMENT INTEREST

This invention was made with Government support under Contract Number N00014-01-1-0175 awarded by the Office of Naval Research (ONR), and Contract Number F49620-03-1-0129 awarded by the Air Force Office of Scientific Research (AFOSR). The Government has certain rights in the invention.

FIELD OF THE INVENTION

The present invention is related to methods, systems and program products for computer based collaboration.

BACKGROUND

Modern times challenge organizations and their leaders to adapt quickly and well to complex, fast-moving circumstances under trying conditions. Data sources are numerous, distributed, and contradictory. Problems are difficult to detect and diagnose, widely dispersed, and constantly changing. Knowledge sources and expertise are distributed, of varying quality, and difficult to integrate. Moreover, the tools available to address these problems are increasing in complexity, computational intensity, and require specialized hardware, software, and maintenance.

Against this backdrop, large-scale computer networks have developed at a rapid pace, allowing organizations and individuals to interact through web portals, e-mail, instant messaging, and other tools. These tools have had immediate impact in allowing individuals to communicate with one another conveniently and efficiently. This has enabled the traditional means of human-to-human organizational collaboration to be carried out more effectively at a distance.

Due to factors such as the volume and distribution of available information, number of collaboration participants, rapidly changing circumstances and the like, known collaboration methods and systems can be prone to inefficiency. For example, discussions on known computer message boards where users post messages in response to previous messages can be superficial, scattered, and lack engagement. Groups communicating with one another to address a problem can drift off on tangents removed from the task at hand. These and other problems become more prevalent and troublesome as the number of participants, the quantity of communications therebetween and the quantity of information being accessed increase. These problems are at least partially a result of a lack of focus and organization of the communications. Due to a large volume of communications data, for instance, users can have difficulty in seeing the "big picture" of a discussion.

INVENTION SUMMARY

The present invention includes methods, computer program products, and systems for computer based collaboration. An exemplary method for computer based collaboration between a plurality of participants communicating over a data network comprises the steps of receiving communications data, using a text analysis tool to identify at least a plurality of k-words from the communications data and a plurality of relations linking at least a portion of the plurality of k-words, and displaying the k-words and relations to the plurality of participants over the computer network.

DETAILED DESCRIPTION

Before discussing the present invention in detail, it will be appreciated that the invention may be embodied in a method, a system, and/or in a computer program product. For example, a method of the invention may be carried out by one or more users using computers, and a program product of the invention may include computer executable instructions that when executed by one or more computers cause one or more computers to carry out a method of the invention. Further, one or more computers that are executing a program product of the invention may embody a system of the invention. It will therefore be appreciated that in describing a particular embodiment of the present invention, description of other embodiments may also be made. For example, it will be understood that when describing a method of the invention, a system and/or a program product of the invention may likewise be described.

Figure 1:
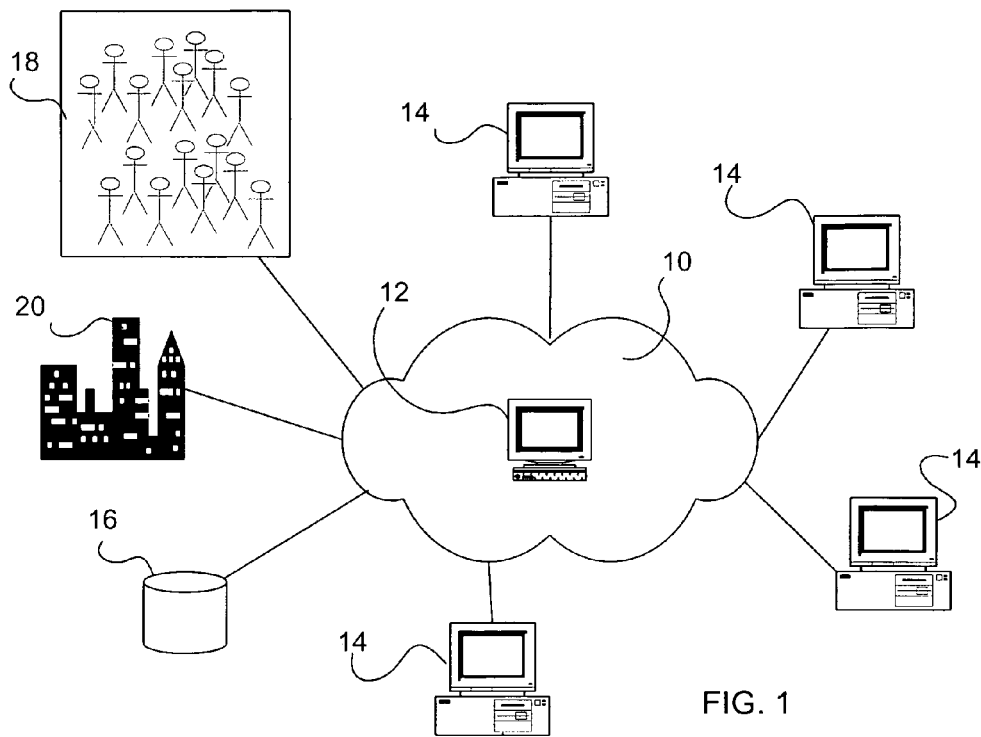
FIG. 1 is a schematic of a computer network useful to illustrate practice of methods and systems of the invention.

Turning now to the drawings, FIG. 1 is a schematic of an exemplary data network that may be useful for practice of embodiments of the invention. The network 10 includes at least one computer 12, and is connected to a plurality of computers 14. The computers may be used by participants such as individuals or groups, or the like. Herein the computers 14 may be referred to as participants 14 to indicate that one or more people are using the computers 14 to communicate with the network 10. Also, the computers 14 are intended to broadly represent processor based devices useful to communicate with the network 10, and may be by way of example phones, personal digital assistants, handheld processor based devices, and the like.

The network 10 may be any suitable communications network, with examples including a digital data network, a PSTN, a digital phone network, a wireless network, or a combination of one or more of these. The network 10 may be, for instance, the Internet. The network 10 is useful to communicate digital data, and may be using a packet-based protocol such as internet protocol to operate. The participants 14 may communicate with the network 10 and the computer 12 via wired or wireless connections as are generally known. The network 10 may also be connected to one or more data storage mediums 16, which may be a computer, a memory device, or the like. The network 10 is also preferably linked for communicating with one or more individuals that have been collectively illustrated as the plurality of individuals 18. The network is also connected to other outside real-world sources that have collectively been illustrated for convenience as the "city" 20. The individuals 18 are intended to broadly represent any people that are able to be communicated with over the network 10. They may be, for example, a plurality of centralized or distributed customers, employees, survey participants, experts in a particular field, students, focus groups, or the like. The city 20 is intended to broadly represent real-world data sources, which may include for example media such as radio, TV, newspaper, wire sources, and periodicals; government agencies; trade groups; and the like.

Having now described an exemplary environment for practicing an embodiment of the invention, exemplary program products, methods and systems for computer based collaboration may now be described. As used herein, the term "computer based" is intended to be broadly interpreted as including the use of a processor based device, such as a computer. A method for computer based collaboration of the invention may include, for example, the participants 14 communicating with one another over the network 10 to share ideas or to solve a problem. This may take the form of the participants 14 sharing text messages that are received by the computer 12 and displayed over the network 10 with all of the participants 14.

Other embodiments of the invention may involve the participants 14 collaborating to analyze or otherwise discuss data that is being communicated over the network 10. Incoming data from the real world 20, for example, may describe one or more events occurring in substantially real time, which may be analyzed by the participants 14 through collaborative communication over the network 10. For example, data may be communicated from the real world 20 describing the unfolding event, and the participants 14 may collaboratively communicate to analyze the incoming real world data and make predictions regarding how it will proceed.

Figure 2:
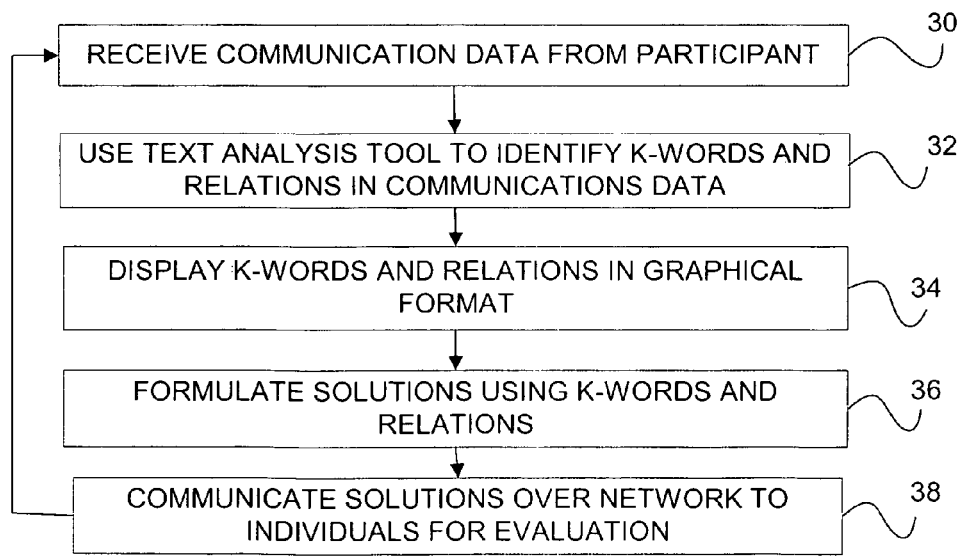
FIG. 2 is a flowchart of one embodiment of a method of the invention.

Exemplary methods, program products and systems of the invention may be further described through consideration of the flowchart of FIG. 2 in combination with the schematic of FIG. 1. At block 30, communications data is received at the computer 12 from one of the participants 14. The communications data may be, for example, text data typed in at a keyboard by any of the participants 14. In addition to text data, the communications data may be in other forms, with speech being an example. Speech may be input into telephones or microphones connected to a participant's 14 computer that is then converted to text. In this manner, methods of the invention may be practiced during phone or video conferences between participants 14.

The exemplary method of FIG. 2 next includes a step of using a text analysis tool to analyze the communications data to identify k-words and relations. (block 32). As used herein, the term "k-word" is intended to be broadly interpreted as a word, phrase of two or more words, symbol or other non-alphabetic character, or the like from the communications data that summarizes a meaningful aspect of the data. That is, a k-word summarizes or gives an indication of the meaning of a passage in which it occurs. A passage of multiple words may be more briefly summarized through only a few k-words. By way of a simplistic illustration, the sentence "(W)hen Mary went to the fruit store, Mary bought six pieces of fruit," might include the k-words "mary," "bought," "fruit," and "Mary bought fruit." K-words may be identified, for example, based on statistical significance. In the above simplistic example, "Mary" and "fruit" each occur twice and are therefore statistically significant. The term "relation" is intended to be broadly interpreted as meaning a logical connection. Referring again to the simplistic example, a relation may exist between the k-words "mary" and "bought," and between the k-words "fruit" and "bought." Relations may be identified through statistical and other methods. With reference to the simplistic example above, for instance, the proximity in the original text of the k-words "Mary" and "fruit" may suggest that there is a relation between the two.

It is noted that in some invention embodiments "k-words" may alternately be referred to as "keywords." Exemplary invention embodiments discussed herein, however, may include use of Keygraphs as text analysis tools. As indicated herein below, the term "keyword" has a specific meaning within Keygraphs, so for clarity herein the term "k-word" is used in the scope of the larger invention and the term "keyword" is limited to its specific meaning within a Keygraph.

The term "text analysis tool" is intended to be broadly interpreted as meaning a tool or a method that may be embodied in computer code for analyzing data to identify k-words and relations. Those knowledgeable in the art will appreciate that there are a wide variety of text analysis tools suitable for use in methods and program products of the invention. Examples include numerical, statistical, adaptive optimization, heuristic, artificial intelligence and language processing methods useful to perceive frequencies, patterns, sequences, regularities and other features of text data. Many useful text analysis tools employ statistical analysis to identify the frequency of occurrence of words or phrases in a given text. Words or phrases that occur more frequently are concluded to have a higher probability of being relevant to the subject matter, and are identified as k-words. Metrics may be applied, such defining k-words as some portion (e.g., the top X %) of the most frequently appearing words or terms in the communications.

As used herein, "text analysis tools" are not limited to use with analyzing purely textual data. They may be used to identify, for instance, non-textual k-words such as numbers or non-alphabetic symbols that are used in a textual manner. Symbols or numbers, for instance, may be used in place of words within a text passage or to identify locations on a map or visual image. Text analysis tools may identify these numbers or non-alphabetic symbols of significance. A particular example may be the identification of common image features (k-words) from communications data comprising a plurality of photographic images.

Some text analysis tools also analyze word or term placement or position in the communications data to identify relevance and/or relations between words or phrases. For example, words or phrases that are found to occur in a high frequency closely proximate to one another may be concluded to have a higher probability of being related to one another, thereby suggesting a relation. The positional closeness of the words to one another in the communications data may be useful to identify a relation. Relations between k-words could be identified, for instance, linking k-words that appear adjacent to one another, within some number X of words to one another, within the same sentence, within sequential sentences, within the same paragraph, etc. Relative placement or positional closeness of k-words may also be useful to estimate relative strength of the relation.

Text analysis tools may also employ filters to filter out words not likely to be relevant (e.g., filter out all pronouns, prepositions, etc.), may use grammatical analysis to identify nouns and verbs, and perform other similar steps. Some text analysis tools are directed to identifying the underlying meaning of text through semantic analysis or other steps.

It has been discovered that steps of using particular text analysis methods offer distinct advantages and benefits in practice of the invention for some applications. In particular, methods including steps of chance discovery are preferred for some applications.

Many text analysis tools employ statistical techniques that implicitly rely on sufficiently large data samples to give the researcher confidence that the knowledge mined is statistically significant. While in many applications this leads to satisfactory results, it has been discovered that in some applications such techniques can lead to superficial and otherwise unsatisfactory outcomes. Human mining of data, as opposed to purely statistical techniques, often relies on few samples and a heightened sensitivity to and interpretation of unusual occurrences or chance events. The literature of scientific discovery is filled with poignant examples (the discovery of penicillin being one). Methods, systems and program products of the invention that use of text analysis tools that perform chance discovery to identify k-words and relations take advantage of this human-like heightened sensitivity and identification of unusual or chance events of significance.

As used herein, the term "chance discovery" is intended to be broadly interpreted as meaning identifying a k-word and/or relation through means other than high frequency of occurrence. Put another way, chance discovery does not rely only on statistical significance alone. A chance discovery can be, for example, an event or a situation with significant impact on human decision making. Chance discovery can lead to an awareness of and explanation of the significance of a chance, especially if the chance is rare and its significance has been unnoticed. In other words, chance discovery can be used to provide means for inventing or surviving in the future, rather than predicting the future.

Steps of chance discovery can include identifying k-words that occur with a low frequency in text but have a relatively high probability of being important. A step of chance discovery may include identifying a k-word that although it fails to meet the statistical cut-off for otherwise identifying k-words (e.g., not in the top X % of frequency), it is discovered that each of the few instances that the k-word appears are closely proximate to one or more high frequency k-words. Random selection of low frequency words or phrases is another example step of performing chance discovery.

Referring again to the flowchart of FIG. 2, after identifying the k-words and relations, they are displayed in a graphical format. (block 34). The graphical format may include, for instance, graphs such as bar graphs and the like, charts such as pie charts and the like, diagrams such as logic diagrams and the like, as well as any other suitable graphical format. Preferably, the graphical display illustrates k-words as nodes and relations as links that connect relevant k-word nodes to one another. In some exemplary steps, the graphical format attaches significance to the relative spatial position of the k-words on the graph. Other embodiments of the invention may display k-words and relations in formats other than a graphical one, with an example being an outline format.

These and other exemplary steps of using text analysis tools to identify k-words and relations (block 32) and displaying them in a graphical format (block 34) are useful to look beneath the surface of text data. Subtle and not otherwise readily apparent concepts can come to light. Also, steps of employing chance discovery in the identification of k-words and relations can be particularly useful in some applications to identify rare but relevant k-words and relations to understand points of view that are otherwise not easily discerned from the text.

One exemplary method displaying k-words and relations (block 34) as well as for identifying k-words and relations that can include steps of chance discovery (block 32) is the so-called Keygraph method. Those knowledgeable in the art appreciate that Keygraph methods lead to graphical representations called Keygraphs of text and other delimited data that group (1) statistically prominent words (k-words) and their relations to others and (2) statistically less frequent words (also k-words) and their relations to clusters of the prominent words. In a Keygraph, k-words are displayed as nodes and relations as lines linking nodes to one another. Herein the term Keygraph may be used to describe a particular format of graphical display in which, as well as to describe the steps used to produce the output graphical display from the input data. For example, applying a Keygraph analysis to a set of data results in the output Keygraph.

While statistically prominent words are often the focus of traditional data mining, humans familiar with the situations represented by the data often find statistically prominent clusters to be obvious or superficial. An important advantage of chance discovery is to dig beneath the prominent clusters and mine less prominent, but possibly meaningful terms. Text analysis tools using chance discovery, with a preferred example being the Keygraph analysis, provides a method for doing so.

Figure 3:
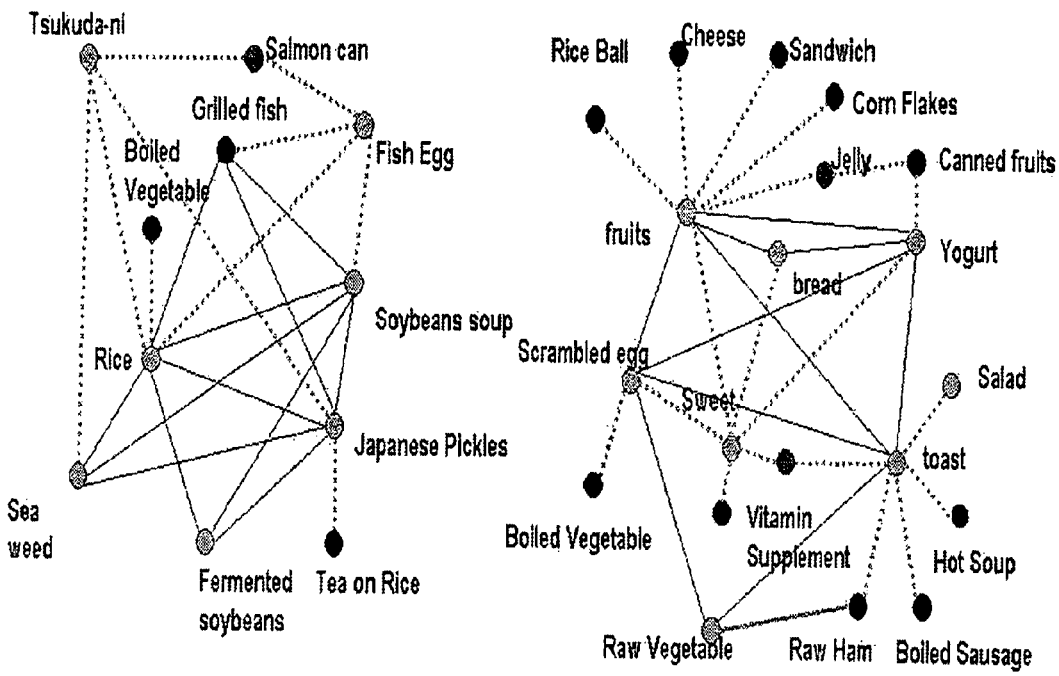
FIG. 3 is an exemplary Keygraph.

FIG. 3 is an example Keygraph produced through a Keygraph analysis of a relatively small set of data related to Japanese breakfast consumption. K-words are displayed as nodes with links between the nodes representing relations. In the graph, two major clusters emerge, corresponding to the Japanese tendency to eat both traditional Japanese and Western-style breakfast meals. Chance discovery identified the "vitamins" k-word. If this Keygraph was presented to a focus group of Japanese consumers, the focus group might immediately recognize the two clusters, but puzzle over the presence of the "vitamins" node in one of the clusters. Vitamin supplements are not a staple of the Japanese diet, but the focus group also perceived that the increased Westernization of the Japanese diet was upsetting the balance and healthfulness of that diet and that "vitamins" might be a response by a certain small number of consumers to try to restore balance and health. Users of the Keygraph such as marketing analysts might recognize "vitamins" as a marketing opportunity for vitamin supplements and vitamin fortified foods.

Those knowledgeable in the art appreciate that Keygraph analysis steps and Keygraph outputs are generally known. The following summary describes exemplary steps of one Keygraph analysis useful in practice of the invention. Other particular Keygraph analysis steps are likewise useful in practice of the invention.

Assume a document D is composed of sentences and each sentence is composed of words. In a first step of performing a Keygraph text analysis, the document D is preprocessed in two steps:

1. Document compaction: Words likely to be insignificant are removed from the document using a list of words and word stems. The list may be supplied from a source or be user specified, may be designated to include prepositions and pronouns, and the like. For example, words such as "the," "he," "it," "at," etc. may be removed or replaced. Also, the list may include word stems that are used to reduce related words to the same root. For example, words like "innovate", "innovates", and "innovating" are reduced to "innovate."

2. Conversion to phrases: The text is converted to a series of phrases which may or may not be k-words. Preference is given to longer phrases with higher frequency. A subset of phrase words are chosen from the document and all possible phrases out of those words are constructed. A phrase that occurs with the highest frequency in the document is retained.

After preprocessing, the document D is reduced to D' which consists of unique terms $w_1; w_2; \ldots$, where a term $w_i$ refers to either a word or a phrase.

As described below, the Keygraph analysis will identify two kinds of k-words: "high-frequency terms," and "low-frequency terms." Low-frequency terms link clusters of high frequency terms to one another, and may be referred to as "keywords" or "key terms." Two kinds or relations are identified: "links," and "key links." Links connect high-frequency terms to one another, and key-links connect low frequency terms (keywords) to high frequency terms. Key-links may be displayed on a Keygraph using a dashed line, and links using a solid line. Also, either of low or high frequency terms may be identified as "keywords" within the following keygraph analysis depending on the links and key-links connected to that term. Keywords connect clusters of terms to one another.

High-frequency terms are first extracted. Terms in D' are sorted by their frequency of occurrence and top nodes of high-frequency terms are retained. These high-frequency terms may be later be represented as nodes in a graph G. A set of the high-frequency terms is denoted by $N_{HF}$.

Links are then extracted. Statistically, a link may be thought of as representing co-occurrence-term-pairs that often occur in the same sentence. A measure for co-occurrence of terms $w_i$ and $w_j$ is defined as:

$$assoc(w_i, w_j) = \sum_{s \in D} \min(|w_i|_s, |w_j|_s)$$

where $w_i$ and $w_j$ are elements of the set $N_{HF}$, and $|w_i|_s$ is the number of times a term $w_i$ occurs in a sentence s. The assoc values are computed for all pairs of high-frequency terms in $N_{HF}$. The term-pairs are sorted according to their assoc values and the top $N_{HF}-1$ tightly associated term-pairs are taken to be the links. The relations between term-pairs are represented by the edges in G.

Low frequency or key terms are then extracted. Key terms are terms that connect clusters of high-frequency terms together. To measure the tightness with which a term w connects a cluster, the following function is defined:

$$key(w) = 1 - \prod_{g \subset G}\left[1 - \frac{based(w, g)}{neighbors(g)}\right],$$

where g is a cluster, and $$based(w, g) = \sum_{s \in D} |w|_s |g - w|_s,$$

$$neighbors(w) = \sum_{s \in D}\sum_{w \in s} |w|_s |g - w|_s,$$

$$|g - w|_s = \begin{cases} |g|_s - |w|_s & \text{if } w \in g, \\ |g|_s & \text{if } w \notin g \end{cases}$$

where $|g|_s$ is the number of times a cluster g occurs in a sentence s.

Qualitatively, key(w) gives a measure of how often a term w occurs near a cluster of high-frequency terms. The key values are computed for all the terms in D, and $n_{key}$ top key terms are taken as high-key terms. These high-key terms are added as to the output graph G as nodes (if they are not already present) and are elements of a set $K_{HK}$.

Key links are then extracted. For each high-frequency term $w_i \in N_{HF}$ and each high-key term $w_j \in K_{HK}$, the $assoc(w_i; w_j)$ is calculated. Links touching $w_j$ are sorted by their assoc values for each high-key term $w_j \in K_{HK}$. A link with highest assoc values connecting $w_j$ to two or more clusters is chosen as a key link. Key links are represented by edges (if they are not already present) in the output graph G.

Extracting Keywords: Either of high or low frequency terms may be identified as keywords depending on the links and key-links connected to it. Keywords link clusters of terms to one another. To extract keywords, nodes in G are sorted by the sum of assoc values associated with the key links touching them. Terms represented by nodes of higher values of these sums than a certain threshold are extracted as keywords for the document D.

It will thereby be appreciated that exemplary methods, program products and systems of the invention are useful to perform computer based collaborations. Through steps of the invention, collaboration participants are able to communicate between one another, and to view a graphical summary of their shared communications that keeps the collaboration focused and provides direction for advancing it. Embodiments of the invention may include additional steps to further the collaboration, and to, for instance, identify suitable solutions to a problem being collaboratively discussed. Exemplary steps include using tools such as genetic algorithms, knowledge management tools, modeling tools, predictive tools, and the like.

The flowchart of FIG. 2 illustrates some exemplary additional steps. Referring now to FIG. 1 in combination with FIG. 2, during the collaboration the participants 14 may use the displayed k-words and relations to develop one or more candidate solutions to a problem. (block 36). The candidate solution(s) may then be communicated over the network 10 to the group of individuals 18 for evaluation. (block 38). The individuals 18 may be a consumer focus group, for example, whose opinions may be asked of a proposed new product. The individuals may be provided with individual computers or other devices in communication with the network 10 for communicating their evaluation so that the evaluation can be viewed in substantially real time by the participants 14 over the network 10. As illustrated in FIG. 2, the participants may continue to communicate with one another and further evolve solutions based on the continuous feedback of the individuals 18. The collaboration may continue until a suitable solution is identified.

It has also been discovered that steps of using a genetic operator can provide benefits and advantages in combination with other steps of the invention. For example, the steps of formulating a solution (block 36) and evaluating it (block 38) may benefit through use of a genetic operator to evolve a satisfactory solution over several iterations.

Genetic operators and their use to alter solution sets over iterative application are generally known and for sake of brevity need not be discussed herein in great detail. By way of general summary, subparts of solutions are referred to as "gene," with a group of genes making up one solution referred to as a "chromosome." Genetic operators may be applied to the chromosomes and/or the genes to generate new solutions. Some subjective or objective scoring criteria is used to evaluate the solutions and choose which are good and which are bad. The process may continue over multiple iterations until a satisfactory solution set is evolved. As used herein, the term "solution set" is intended to be broadly interpreted as including one or more solutions. The term "solution" is likewise intended to be broadly interpreted. Examples of "solutions" include proposals to solve a problem, textual expressions of ideas, product designs, terms, images, symbols, and the like.

Figure 4:
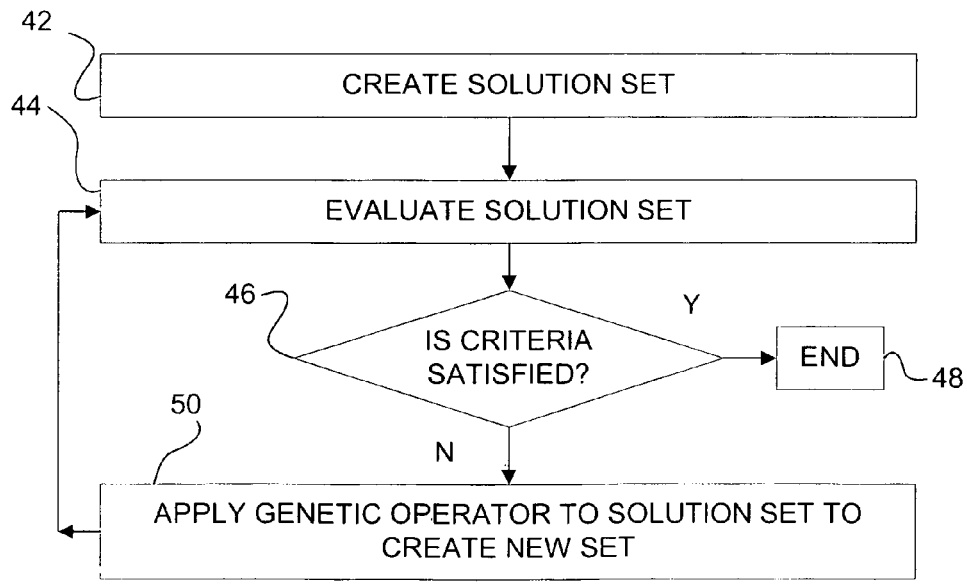
FIG. 4 is a flowchart showing exemplary steps of applying a genetic algorithm.

By way of further summary, FIG. 4 is a flowchart illustrating one set of exemplary steps of applying a genetic operator that will be useful in practice of embodiments of the invention. Referring to FIG. 4 in combination with FIG. 1, a solution set is initially created. (block 42). The step of initially creating a solution set may comprise, for example, the participants 14 formulating solutions using k-words and relations discovered through a Keygraph.

The solution set is then evaluated. (block 44). This may comprise, for instance, communicating the solution set over the network 10 to the individuals 18 (FIG. 1) for subjective evaluation (e.g., "which solutions are 'good,' which are 'bad,' which is 'best,' which is 'worst'"?). The individuals may be, for instance, a focus group using computers connected to the network 10 over which they view the solutions and input their evaluations. The step of evaluating the solutions (block 44) may also comprise submitting the solution set to a computer (with the computer 12 or any of the participant computers 14 being examples) for application of an objective scoring metric (e.g., score using measuring criteria on a scale of 1-100).

If final criteria are satisfied (block 46), then a final solution has been evolved and the process is stopped. (block 48). The final criteria may be subjective or objective. Exemplary subjective evaluation criteria may simply be that the solution(s) or some proportion of a solution set has been evaluated as "good," while an exemplary objective criterion is that the solution or some proportion of a solution set has been evaluated to have a numerical score above some threshold. If the solution criteria are not satisfied, a genetic operator is applied to generate a new solution set. (block 50). Exemplary genetic operators include crossover, mutation, replacement, or other like operators for estimating and sampling a probability distribution and the like. Through application of a mutation operator, for instance, one solution might mutate into a different form. Application of a crossover operator might replace sub-parts ("genes") of one solution ("chromosome") with those of another. Replacement might replace a low scoring solution with a high scoring one. Iterations of evaluation and application of a genetic operator are then repeated until the completion criteria are satisfied. (blocks 44-50).

It will be appreciated that the steps of FIG. 4 are exemplary only, and many additional and equivalent steps may be performed. For example, prior to application of a genetic operator, it may be useful to remove the lowest scoring of the solutions from the solution set. Also, the sequence of the steps of FIG. 4 can be altered. Also, it will be appreciated that steps of evolving an improving solution in methods, systems and program products of the invention are not limited to use of a genetic operator.

Once again referring to FIG. 4 in combination with FIG. 1, the steps of FIG. 4 may be performed by one or more of the participants 14, other individuals, and/or by computers such as the computers 12 or 14. For example, the step of formulating a solution set (block 42) may be performed by a participant(s) 14, the individuals 18, or by a computer 12 or 14. Likewise, the steps of determining whether completion criteria have been satisfied (block 46) and of applying a genetic operator (block 50) may be performed by a participant(s) 14 or the individuals 18 using k-words and relations identified through steps of the invention. Or, those k-words and relations may be used by a computer 12 to formulate one or more solutions. Similarly, one or more of the participants 14 or individuals 18 can apply a genetic operator to these solutions to evolve a new solution set. This new solution set may be evaluated by the participants 14, the individuals 18, or a computer 12 to identify promising new solutions.

Referring to FIG. 1, methods and program products of the invention may also include one or more steps of using data mining or text analysis tools to interpret and process data from the data storage medium 16, the real-world sources 20, and/or the individuals 18. As used herein, the term "data mining" is intended to be broadly interpreted as including methods for analyzing data using statistical or other means to summarize the content of data, or to identify correlations, patterns, sequences, regularities, develop models including predictive models, and the like. One of the participants 14, for example, may perform a step of data mining to further explore issues surrounding one or more k-words identified during collaborative discussion.

Exemplary Message Board Embodiment

Exemplary methods, program products and systems of the invention may be useful with applications such as computer message boards or computer bulletin boards. Message or bulletin boards practiced through embodiments of the present invention include many steps heretofore unknown and provide many benefits and advantages not previously available.

Figure 5:
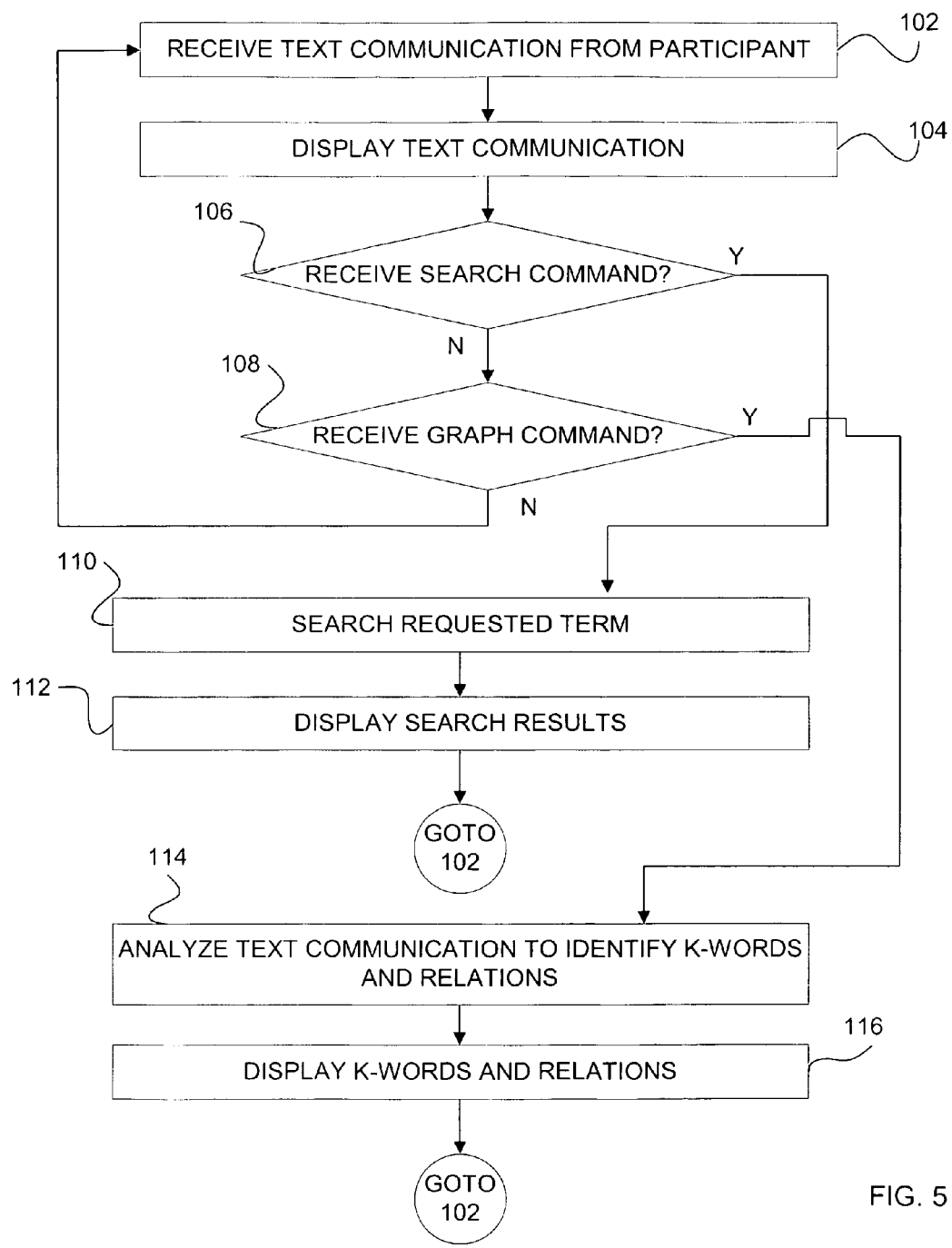
FIG. 5 is a flowchart of an additional method of the invention.

FIG. 5 is a flowchart illustrating an exemplary invention embodiment for computer based collaboration that may be used in a computer message or bulleting board application. Referring to FIG. 1 in combination with FIG. 5, the steps of FIG. 5 may be carried out by one or more computers connected to the network 10, with the computer 12 being an example. Communications are received from one of the participants 14 (block 102) and are displayed (block 104). This may include, for example, a discrete text message being input from one of the participant computers 14, received by the computer 12 running a program product of the invention, and displayed over the network 10 for viewing by any or all of the participants 14.

The method of FIG. 5 proceeds to determine whether a search command (block 106) or a graph command (block 108) has been received. If not, the method loops to receive additional discrete text messages from the same or others of the participants 14. Discrete messages may be sent as a reply to one or more previous messages, and may be displayed in a format that indicates their relation to one another, with exemplary formats including as organized groups and as threads of discrete messages. In this manner the participants 14 may collaborate with one another over the network 10 to share ideas, strategies, or suggestions for a wide variety of purposes. As an example, the participants 14 may collaborate to solve a particular problem that has been presented to them. Collaboration may occur in real-time with the participants 14 talking or writing to one another "live," or may occur over a more prolonged time with individual participants 14 picking up the discussion at different times as their respective schedules allow.

If a search command is received, a step of searching a selected term or phrase may be performed (block 110). The term may be selected through highlighting with a culsor, may be manually entered through typing, or can be selected through other steps. As used herein the term "search" is intended to be broadly interpreted as meaning using a search term to identify relevant information. It will be appreciated that a wide variety of searches can be performed, using a wide variety of information sources.

Referring by way of illustration to FIG. 1, a search may be performed, for example, of any data capable of being stored on the storage device 16. Examples include a dictionary, treatise, technical reference, literature, database, survey results, catalogs, or the like. Also, the search may be performed by searching the World Wide Web (or source available thereon) or other secondary network that may be connected to the network 10. These secondary networks may provide access to a wide variety of information sources. Data sources available from the real world 20 may likewise be accessed for searching. Referring once again to FIG. 5, results of the search are displayed (block 112). The display may be made over the network 10 for viewing by all of the participants 14. Search results may be displayed by a priority ranking, and may include hyperlinks or other access to further information whereby a participant can quickly access further information if desired.

The method of FIG. 5 further includes a step of determining whether a "graph command" has been received (block 108). If not, the method loops back to block 102 to receive additional communications. If a graph command has been received, a step of analyzing a text message to identify k-words and relations is performed. (block 114). The k-words and relations may be identified using one or more text analysis tools, and are preferably identified using a Keygraph analysis. The identified k-words and relations from one or more of the discrete text messages are then displayed in a graphical format (block 116). Preferably, the graphical display illustrates k-words as linked to one another by links that represent relations. A preferred graphical display is a Keygraph.

Figure 6:
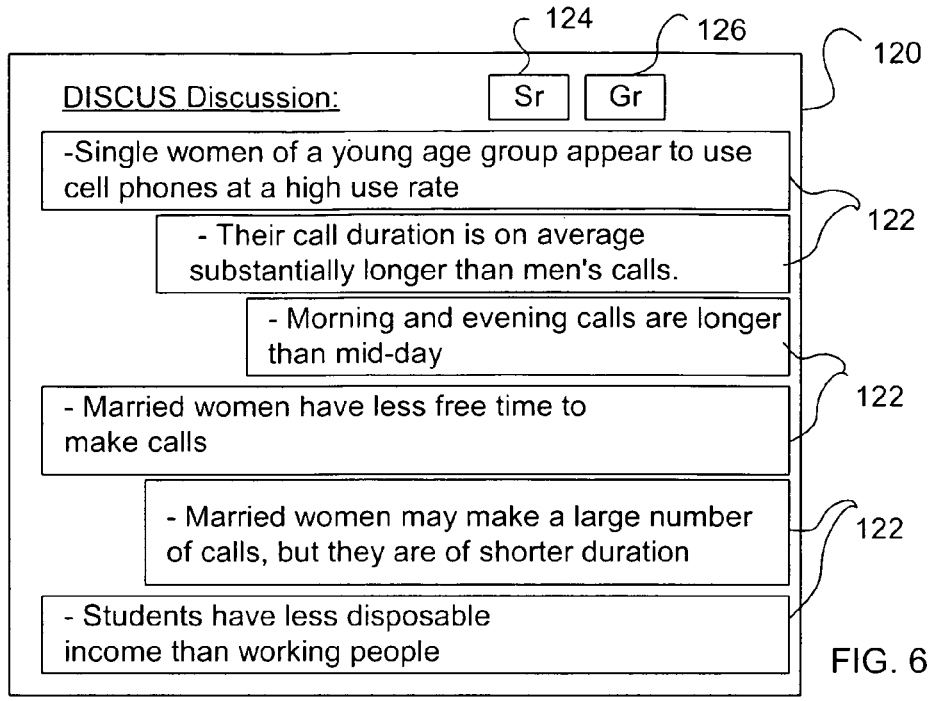
FIG. 6 illustrates a screen displayed through practice of one embodiment of the invention.

These and other steps can be further illustrated by reference to the exemplary display screen 120 of FIG. 6 that displays discrete text messages 122 that have been input by participants 14 of FIG. 1. In this example, the participants 14 are collaborating over the network 10 to develop a strategy for marketing wireless phones to women. Each discrete message 122 may have been input by one of the participants 14, and as illustrated may be displayed in a hierarchical (e.g., indentation used to represent relation to above message) or other organized format that makes clear which message 122 has been communicated in response to which previous message 122.

The "Sr" button 124 displayed on the screen 120 may be selected by a user using a mouse, keyboard or the like to generate a search command. (FIG. 5, blocks 106, 110 and 112). A k-word or other word or phrase may be selected by highlighting, entering, or the like in combination with selecting the Sr button to identify the term to be searched. Selection of the displayed graph button "Gr" 126 using a keyboard, mouse or other selector can cause the graph command to be generated (FIG. 5, blocks 108, 114 and 116). This command causes the text analysis to be performed to identify k-words and relations.

In exemplary embodiments of the invention, a user may select what text to apply text analysis to. For example, a user may desire to "graph" an individual selection of text (e.g., one particular message input by a particular user), or may desire to graph several text messages in combination (e.g., the overall collection of all input messages). Accordingly, methods of the invention contemplate providing a graphical representation of k-words and relations from only one message or from a collection of related messages. The desired text may be selected by use of a keyboard, mouse, or other selector.

If applied to multiple of the messages, the text analysis tool examines the collective text of all of the messages to identify k-words and relations in the collective text. When measuring frequency of occurrence of terms or phrases in the overall collective discussion, for example, all of the text messages are combined and treated as a single block of text. It has been discovered that it is often beneficial to perform steps of identifying and displaying k-words and relations of the overall discussion as opposed to discrete messages so an evolving graph display illustrates the history and Current status of the overall discussion.

When identifying k-words and relations from more than one text message, application of the text analysis tools to the collection of the text messages preferably results in identifying relations that link a k-word from a first message to one from a second message. That is, k-words and relations are preferably identified that tie the multiple messages to one another.

Figure 7:
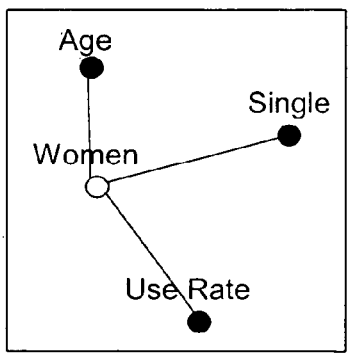
FIG. 7 illustrates an additional screen displayed through practice of an embodiment of the invention.
Figure 8:
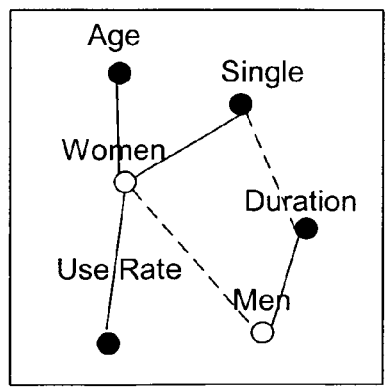
FIG. 8 illustrates an additional screen displayed through practice of an embodiment of the invention.
Figure 9:
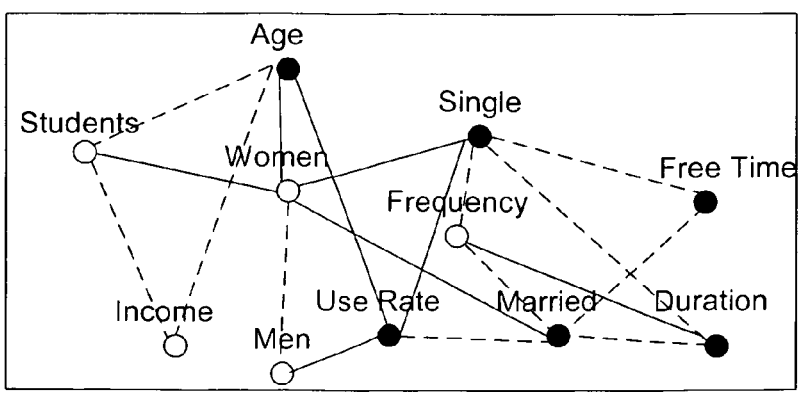
FIG. 9 illustrates an additional screen displayed through practice of an embodiment of the invention.
Figure 10:
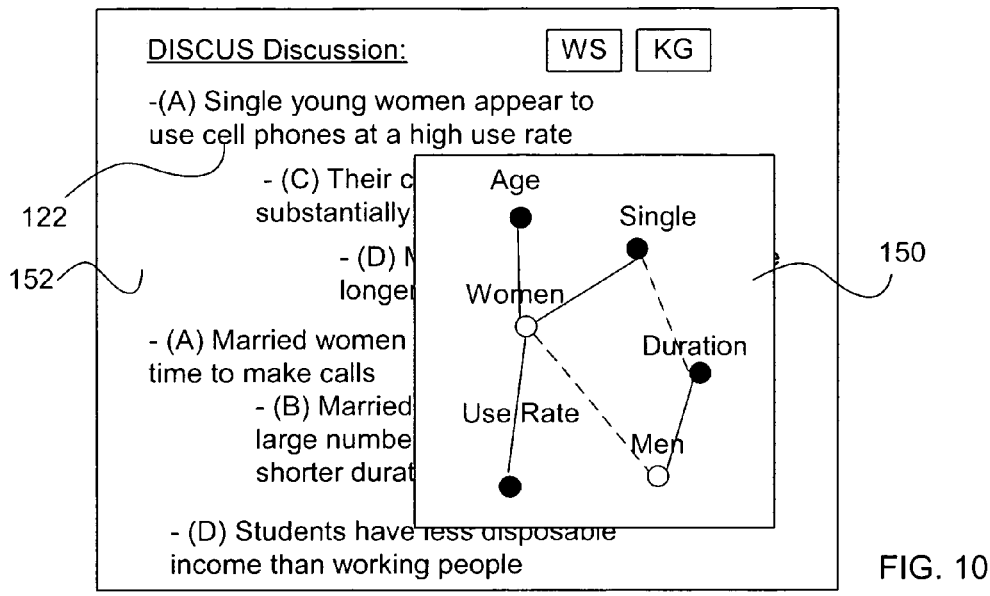
FIG. 10 illustrates an additional screen displayed through practice of an embodiment of the invention.

These steps may be further illustrated through consideration of FIGS. 7-9. FIG. 7 illustrates an exemplary Keygraph display of a first message 122 of FIG. 6. This might result, for instance, after one of the participants 14 (FIG. 1) input the first message or highlighted the first message selected the Gr button 126. The Keygraph of FIG. 8 represents k-words and relations from the first and second messages 122 of FIG. 6 combined. This might be generated, for instance, when one of the participants highlighted the first and second messages 122 and selected the Gr button 126. Relations or links connecting k-words from the two different messages are shown, thereby representing the overall discussion and how the second message relates to the first.

The Keygraph of FIG. 9 illustrates the result after several messages have been exchanged. K-words from different of the messages 122 are linked to one another by relations. Also, the k-words and links may differ somewhat from those of earlier Keygraphs as the participants focus on particular issues and/or areas and the discussion accordingly evolves.

Exemplary screens displayed through methods of the invention may display a Keygraph on a first portion of the screen 150, with the text messages 122 displayed on a second portion of the screen 152. The first portion 150 may be a portion of the screen that pops-up when a graph command is issued. The relative sizing and position of the screen portion 150 may be varied as desired. Other exemplary screens include a dedicated first portion for displaying k-words and relations and a dedicated second portion for displaying the underlying communications data. For example, the top half of a screen may display underlying communications data and the bottom half the graphical display or k-words and relations.

Although selective application of k-word and relation identification and display through use of a graph command has been found to be useful in some exemplary embodiments of the invention, other embodiments include steps of substantially real-time graphing as communications data are received (i.e., no graph command need be issued). Referring again to FIG. 1 by way of illustration, as the participants 14 make contributions to the collaboration by communicating text messages to the computer 12, this may have the effect of the participants 14 being able to see in substantially real time how the text they are entering changes the graphically displayed k-words and relations. As each participant 14 makes a contribution to the on-line discussion, for example, the overall frequency of occurrence of various terms may change, and therefore the k-words may change—some previous k-words may be replaced with new ones. This can be useful, for example, to keep the collaboration focused, and to identify promising directions and concepts for furthering the discussion.

Collaboration to Analyze Input Primary Data

Embodiments of the invention will find utility and offer benefits in many different applications. With reference to FIG. 1 by way of illustration, the exemplary invention embodiments described hereto generally include a collaboration occurring between the participants 14. They may be sharing communications directed to solving a posed problem, for instance, over an on-line message board. Methods may include steps of the participants using resources in addition to themselves, including communicating with the exemplary outside sources of data such as the data repository 16, the individuals 18, or the real world 20. In the exemplary invention embodiments described hereto, however, these outside data sources are generally communicated with to support the collaboration between the participants 14. Steps of using the data sources 16, 18 and 20 may be performed, for instance, to research ideas being exchanged between the participants 14 or to evaluate potential solutions.

Other exemplary embodiments of the invention are directed to computer based collaborations wherein data from one or more outside data sources play a more central role in the collaboration. Data may be gathered and input to the network 10 that is the focus of the collaboration. For example, instead of the collaboration being focused on a "static" problem with outside sources communicated with for support or evaluation, the collaboration is directed to analyzing a dynamic event summarized by data being communicated to the network 10. When describing these embodiments herein, for clarity the term "primary communications" or "primary data" will be used to refer to the data input to the network 10 that is the focus of the collaboration, while the communications data shared between the participants 14 in analyzing or discussing the primary data will be referred to as "secondary data" or "secondary communications."

Exemplary Homeland Security Embodiment

Figure 11:
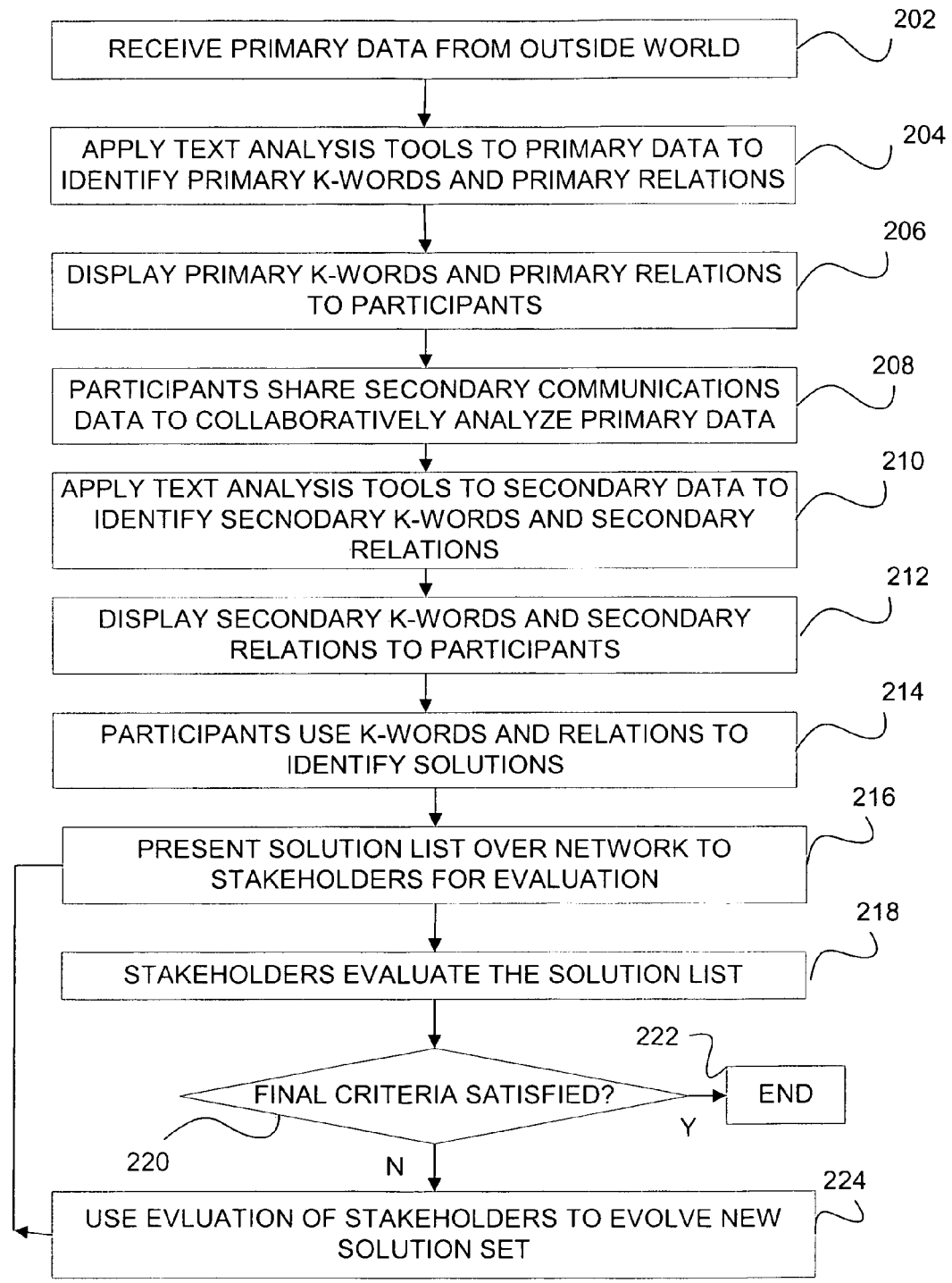
FIG. 11 is a flowchart of an additional exemplary method of the invention.

FIG. 11 is a flowchart illustrating one such exemplary method and program product of the invention. The method of FIG. 11 is similar to that of FIG. 5 in many aspects, with one difference being that the collaboration between the participants 14 (FIG. 1) is focused on analyzing primary data being received by the network 10. This may be illustrated through consideration of an example terrorism application.

Referring now to FIG. 1 in combination with FIG. 11, the method of FIG. 11 may find utility in an application wherein the participants 14 are intelligence analysts collaborating to identify credible terrorist targets in a rapidly unfolding terrorist attack scenario. Primary communications data may be received from the real world 20 (block 202). The real world data sources and primary data may be widely distributed, including international media reports, intelligence reports from intelligence agencies and police forces around the world, signal intelligence from the National Security Agency, CIA and FBI, and heterogeneous reports from defense and counter-intelligence reports. Embodiments of the present invention are useful to provide effective analysis of such varied and high volume data on a real time basis.

Text analysis may be performed on this primary data being received from the outside world 20 to identify primary k-words and primary relations. (block 204). The text analysis tools may include Keygraphs and/or others. The text analysis may be applied to individual of the discrete primary data communications being received (e.g., to individual agent reports and news reports) or collectively to multiple of the discrete primary data communications (e.g., collect all CIA and FBI agent reports and perform text analysis). The text analysis tool may likewise be applied to identify numerical and non-alphabetic k-words that correspond to portions of interest of satellite imagery.

A graphical display of the primary k-words and primary relations is then displayed to the analysts 14 to support their collaborative analysis of the data. (block 206). The graphical display may comprise a chart, graph, outline or the like, with a Keygraph preferred. The analysts 14 review the displayed primary Keygraph and also may review the underlying primary data. They then share secondary communications data with one another over the network 10 to collaboratively develop a list of potential targets and threats using the graphically displayed primary k-words and primary relations generated from the step of applying text analysis to the primary communications data. (block 208).

A step of using text analysis to identify secondary K-words and secondary relations from the secondary communications is performed (block 210), as well as a step of displaying the identified secondary k-words and secondary relations graphically using a chart, graph or the like. (block 212). Preferably this occurs through application of a Keygraph analysis and display of the resulting Keygraph. Through their collaborative sharing of secondary communications data, the analysts 14 may use the k-words and relations to formulate a solution set of potential terrorist targets and timelines of attack. (block 214).

For clarity and ease of use, the graphical display of the primary k-words and relations may be made in a first portion of a screen and the secondary k-words and relations in a second portion of the screen. The first and second portions of the screen may be moved and resized as may be desirable. Also, a third portion of the screen may be used to display any desired portion of the primary communications, and a fourth portion of the screen to display any desired portion of the secondary communications.

The solution set is then presented to the individuals 18 over the network 10 for evaluation. (block 216). The individuals 18 may comprise evaluative stakeholders such as front-line users of intelligence analysis such as military commanders, intelligence officers, embedded operatives, municipal fire officials, aviation administration officials and police officials. While they might not have the benefit of the "big-picture" perspective that the analysts 14 enjoy, the individuals 18 may be close to the action and have a better intuitive feel for evaluating which proposed targets and threats are credible.

The individuals 18 evaluate the submitted list by rating, for instance, each proposed target/threat as credible or not. (block 218). They may also provide additional scoring, such as potential severity or timeliness of the threat. The individuals communicate their evaluation over the network 10 to the computer 12 and to the analysts 14. Based on the received evaluation, the list of threats/targets may either be concluded to be final (blocks 220, 222) or may be further evolved. Concluding the solution set is final may require, for example, that some high percentage of the individuals 18 (e.g., >75%) score all listed threats as "credible," "potentially severe" and "timely."

If final criteria are not satisfied, further evolution preferably occurs through application of a genetic operator (block 224), although other steps are contemplated. The analysts 14, for instance, may review the evaluation provided by the stakeholders 18, may collaborate, and then improve or otherwise alter the solution set. The step of applying a genetic operator may be performed by a computer such as computer 12 or by one or more of the analysts 14.

Methods and program products of the invention such as that illustrated by FIG. 11 may be useful to quickly and effectively process widely distributed and voluminous primary data to identify credible and probable outcomes. In the example hypothetical terrorism application, for instance, chance discovery may identify k-words and relations from the incoming primary communications data that upon application of a Keygraph analysis identifies the possibility of a dirty bomb threat against U.S. troops on the continental U.S.

Through additional steps of the invention, this potential threat is further explored and defined. The Keygraph output may be presented as a Pareto trade-off curve to the analysts 14, who then share secondary communications to collaboratively discuss the threats. Keygraphs of their secondary communications show low-frequency secondary k-words that link critical high frequency secondary k-words. Secondary k-words include several potential dirty bomb targets. When further evolved through application of a genetic algorithm, a dirty bomb threat designed to jeopardize major troop and ship movements from Norfolk, Va. in the coming month of August is identified. This is passed on to the individuals 18 for evaluation, and they conclude the threat to be credible.

Methods of the invention may also include further steps. For example, steps of using other tools to further narrow the solution set may be performed. Exemplary steps include application of modeling, simulation or predictive methods or software to predict the likely consequences of the dirty bomb threats. Referring again to the terrorism application for illustration, the analysts 14 may use data mining to analyze classified signal intelligence that has been stored in the data repository 16 to search the k-words "August," "Norfolk" and "Virginia". Suspicious signals are identified from the stored data, which are then confirmed and decrypted. The results of the data mining steps are displayed to the analysts 14 who then may share further secondary communications to discuss this information. As a result of these additional steps, the likelihood of the threat is further confirmed, potential perpetrators of the threat identified, and its potential date is further narrowed.

Exemplary Marketing Embodiments

Embodiments of the present invention will also be useful and beneficial in a wide variety of marketing applications. Referring again to FIG. 1 by way of illustration, the participants 14 may be one or more of advertisers, marketing managers, product developers and manufacturing engineers. These participants may be collaborating to identify new marketing and product opportunities. The individuals 18 may be a consumer focus group communicated with over the network 10 to survey their likes and dislikes. Opinion data or responses to survey questions, referred to as primary data, may be communicated by the individuals 18 over the network 10 to the participants 14. A step of applying text analysis to the primary data may be performed, with identified primary k-words and primary relations then displayed to the participants 14. They may then share secondary communications data to collaboratively identify marketing opportunities and new product ideas.

Proposed products developed through the collaboration can be presented to the individuals 18 over the network 10, with their response to these proposed new products being primary data communicated back to the participants 14. The participants may view in substantially real-time primary k-words and primary relations in a graphical format identified in the primary data. Iterations of this may be performed to evolve a suitable new product.

Figure 12:
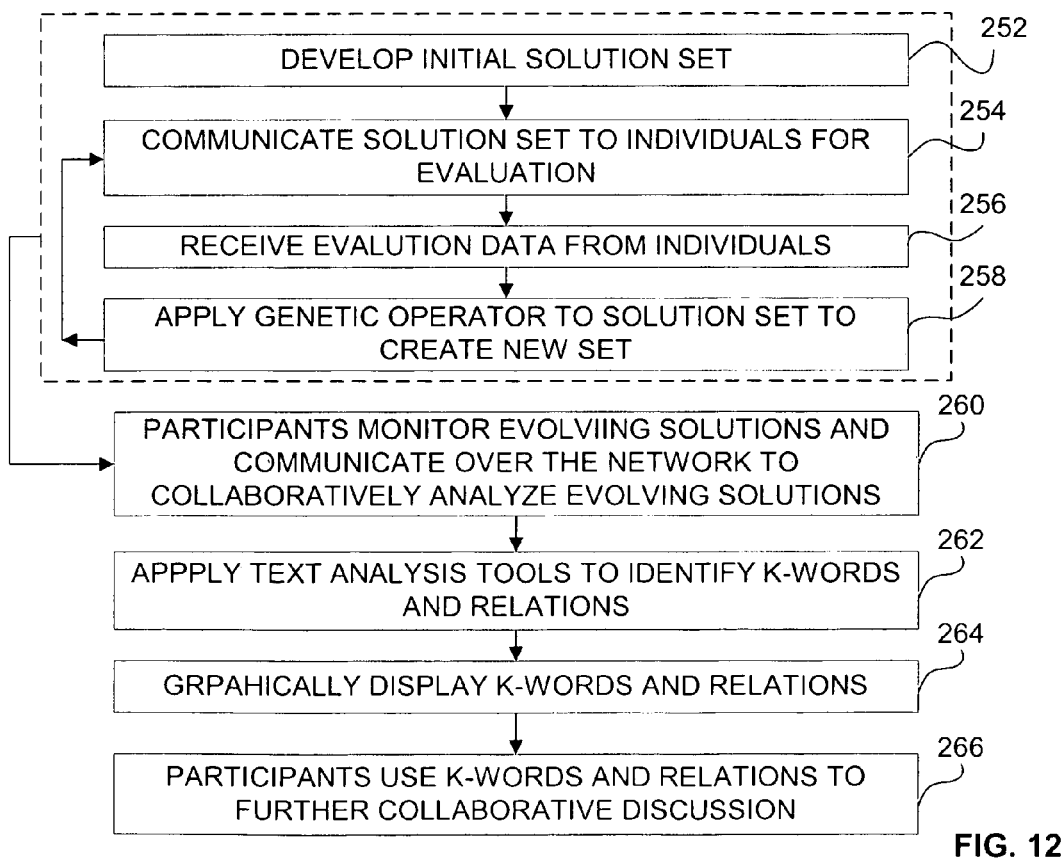
FIG. 12 is a flowchart of an additional exemplary method of the invention.

Other exemplary marketing applications may simply use the opinions of the individuals 18 without application of text analysis to it. By way of illustration, attention is now directed to the flowchart of FIG. 12. Invention embodiments as illustrated by the flowchart of FIG. 12 are generally consistent with those of FIG. 2, with two differences being that the sequence of steps has been altered and additional steps have been included. In the flowchart of FIG. 12, the individuals 18 are consulted initially to provide an initial solution set that is then further evolved through collaborative discussion by the participants 14.

Referring now to FIG. 1 in combination with FIG. 12 by way of illustration, assume that an international automaker is evaluating multiple aspects of its automobile products with hopes of developing features that are desirable to consumers around the world. The individuals 18 represent multiple individual focus groups of auto consumers, each in a different country. An initial solution set comprising aspects of the automaker's existing styling and features as well as its competitor's is developed (block 252) and communicated over the network 10 to the consumers 18 for evaluation. (block 254). The solution set may comprise text (e.g., "minivan with two sliding doors and a sunroof"), images (e.g., a photograph of a minivan with a drastically sloping hood and protruding headlights), or the like. The consumers 18 react to the solutions in the solution set by scoring them on a scale of 1-10, and this evaluation data is communicated over the network for reception by the computer 12 and the participants 14 (block 256).

A step of applying a genetic algorithm is performed to evolve a new set of features. (block 258). The scoring provided by the individuals 18 may be used in applying the genetic operator. This step may include, for instance, substitution of the headlights and hood from one high scoring car model put onto a low scoring model, or the mutation of a low scoring car's shape into a more desirably scored higher and boxier shape. The new solution set showing new features generated through application of one or more genetic operators is presented to the focus groups for evaluation (block 258).

These steps of evaluation and evolution of new features are repeated over multiple iterations as may be desired. The results of the evaluation are communicated over the network as they evolve in substantially real time to the participants 14, who may be the automaker's senior managers, marketers, and manufacturing engineers, for instance. The initial solution generations may track current market share data, but as iterations continue new solution sets may show the automaker's current product line falling farther and farther outside of what is desired by the individuals 18. The iterative evolution of newer solution sets may also identify opportunities for desirable products and features. For example, the consumers 18 may show a preference for SUV-like vehicles that have the speed and handling of a sports car and higher gas mileage than current SUV's. Minivans recast as large SUV-like vehicles are also surprisingly popular.

As the participants 14 view the solutions sets being evolved by the individuals 18 in real time, they may share communications data over the network 10 to collaboratively discuss the evolving solution sets. (block 260). A step of using a text analysis tool may be performed to identify k-words and relations in the shared communications, with the k-words and relations then displayed graphically. (blocks 262, 264). The participants 14 use the graphical output to identify opportunities for global integration of three of seven auto platforms, and identify likely locations for cost-effective production.

Additional steps may also be performed to further evolve the solutions. For example, a step of using a genetic algorithm may be performed, where the participants 14 or the computer 12 may apply a genetic operator(s) to the initially identified platforms and likely manufacturing facilities to further narrow the potential solutions. An additional exemplary step may also be performed of using data mining to analyze consumer preference data stored in the data storage 16 to build a new consumer preference predictive model that can then be used to design an advertising campaign for the new line of vehicles. The developed advertising campaign may be presented to a new set of consumers 18 who suggest modest modifications in three areas to bolster appeal across the consumer spectrum.

Some exemplary invention embodiments that include primary and secondary data may follow the general sequence of 1) gathering primary data and communicating it to the network 10, 2) collaborative sharing of secondary data between participants 14 to discuss the primary data, 3) the participants 14 defining a particular problem, 4) the participants 14 proposing a solution set to the problem, and 5) the solution set being evaluated by the individuals 18. In such circumstances, it has been discovered that it can be useful for the sequencing of steps to be controlled by a moderator. For example, it may be useful for one of the participants 14 to be designated a moderator and given the authority to determine when a step is completed and the next step begun. Without a moderator with this authority, it has been discovered that collaborations can become bogged down and cumbersome. For instance, too much time may be spent gathering an inordinate amount of primary data or on collaborating to discuss the primary data. Accordingly, methods, systems, and program products of the invention may include a step of designating one of the participants 14 as a moderator with the authority to determine completion of various steps of the invention.

It will be appreciated that the present invention when used in any of a variety of applications thereby provides valuable benefits and advantages related to computer-based collaborations. Methods, systems and program products are provided which enable users to effectively use even voluminous and varied data. While specific embodiments of the present invention have been shown and described, it should be understood that other modifications, substitutions and alternatives will be apparent to one of ordinary skill in the art. Such modifications, substitutions and alternatives can be made without departing from the spirit and scope of the invention, which should be determined from the appended claims.

For example, while exemplary methods of the invention have been described herein as including steps in a particular sequence, it will be understood that methods of the invention are not limited to these particular sequences, and that other methods of the invention may be practiced using the same or similar steps in an alternate sequence. Also, while particular sets of steps have been discussed and illustrated as making up a particular exemplary embodiment of the invention, it will be appreciated that one or more steps may be omitted from the set of steps. Likewise, one or more additional steps could be provided.

Various features of the invention are set forth in the appended claims.

What is claimed is:

1. A method for computer based collaboration between a plurality of participants communicating over a data network comprising the steps of:

receiving communications data comprising text;

using a text analysis tool to identify at least a plurality of k-words from said communications data and a plurality of relations linking at least a portion of said plurality of identified k-words in said received communications data to others of said plurality of identified k-words in said received communications data;

displaying said identified k-words and said relations to the plurality of participants over the computer network;

using at least one of said identified k-words and said relations to form a solution set, said solution set comprising a set of solutions;

applying a genetic operator to alter at least a portion of said solution set over at least one iteration to form a new solution set; and displaying at least a portion of said new solution set to the plurality of participants over the data network;

wherein said communications data comprises a first discrete text communication received from a first of the participants, said plurality of identified k-words comprise a plurality of identified first k-words, said plurality of relations comprise a plurality of first relations;

further including the steps of:

receiving a second discrete text communication from a second of the participants;

using said text analysis tool to identify at least a plurality of second k-words from said second communications data and a plurality of second relations between at least a portion of said plurality of identified second k-words and others of said plurality of identified second k-words;

using said text analysis tool to identify at least one third relation between at least one of said identified second k-words and at least one of said identified first k-words; and, displaying said identified second k-words, said second relations, and said at least one third relation to the plurality of participants over the computer network.

2. A method for computer based collaboration as defined by claim 1 wherein said first discrete text communication comprises a discrete text message sent from a first of the participants, and said second discrete text communication comprises a second discrete text message sent from a second of the participants in response to said first discrete text communication.

3. A method for computer based collaboration as defined by claim 1 wherein the steps of displaying said identified k-words and said relations comprises displaying said identified k-words and relations in one or more formats chosen from the group of formats including charts, graphs and outlines.

4. A method for computer based collaboration as defined by claim 1 wherein the step of displaying said identified k-words and said relations comprises displaying said identified k-words and relations in a graphical format wherein said identified k-words are displayed as nodes on a graph and said relations link said k-word nodes to one another.

5. A method for computer based collaboration as defined by claim 1 wherein the step of displaying said identified k-words and said relations is performed in substantially real time as said communications data is received.

6. A method for computer based collaboration as defined by claim 1 wherein said text analysis tool examines at least frequency of occurrence and location of words in said communications data to identify said k-words and said relations.

7. A method for computer based collaboration as defined by claim 1 wherein said text analysis tool performs a step of chance discovery.

8. A method for computer based collaboration as defined by claim 1 wherein said step of using said text analysis tool to identify k-words and relations includes the steps of compacting said communications data, converting said communication data to phrases, extracting high frequency phrases from said converted communications data, and extracting said relations between said high frequency phrases.

9. A method for computer based collaboration as defined by claim 1 wherein the step of using a text analysis tool comprises using a keygraph method, and wherein the step of displaying said identified k-words and relations comprises displaying a keygraph wherein said identified k-words comprise keygraph nodes and said relations comprise links connecting said nodes.

10. A method for computer based collaboration as defined by claim 1 and further including the step of using a genetic operator on at least one of said identified k-words to create said new solution set, and further including the step of communicating said new solution set over the data network for evaluation.

11. A method for computer based collaboration as defined by claim 1 and further including the step of searching a data repository connected to the data network for data related to at least one of said identified k-words.

12. A method for computer based collaboration as defined by claim 1 wherein said communications data comprises primary communications data received from a source other than one of the participants, said identified k-words comprise primary k-words, said relations comprise primary relations, and wherein the method further includes the steps of:
 a plurality of the participants communicating secondary communications data between one another over the data network;
 using a text analysis tool to identify secondary k-words and secondary relations in each of said discrete secondary communications; and,
 displaying said identified secondary k-words and secondary relations over the network to the participants.

13. A method for computer based collaboration as defined by claim 12 and further including the steps of:
 using said identified secondary k-words and secondary relations to form a solution set;
 communicating said solution set over the data network to a plurality of individuals for evaluation; and,
 receiving evaluation of said solution set from said plurality of individuals over the data network.

14. A method for computer based collaboration as defined by claim 13 wherein the method further includes the step of designating one of the participants as a moderator with the authority to determine when each of the steps are completed.

15. A method for computer based collaboration as defined by claim 1 and further including the steps of:
 communicating said new solution set over the data network to one or more evaluators for evaluation;
 receiving evaluation results over the data network from said one or more evaluators; and,
 displaying said evaluation results to the plurality of participants over the data network.

16. A method for computer based collaboration as defined by claim 15 wherein said one or more evaluators comprises a plurality of individuals in communication with the network.

17. A method for computer based collaboration as defined by claim 1 and further including the steps of:
 a. forming said solution set including at least one solution;
 b. communicating said solution set to a plurality of individuals over the data network for evaluation;
 c. receiving evaluation results from said plurality of individuals over the data network;
 d. using said evaluation results and said applied genetic operator to generate a new solution set;
 e. repeating the steps b, c, and d, wherein said solution set evolves; and,
 f. displaying said evolving solution set in substantially real time over the data network to the plurality of participants.

18. A computer program product for performing a collaboration between a plurality of participants over a data network, the program product comprising computer executable instructions stored in a non-transitory computer storage medium that when executed by one or more computers cause one or more computers to perform the method of claim 1.

19. A computer program product for performing a collaboration between a plurality of participants over a data network, the program product comprising computer executable instructions stored in a non-transitory computer storage medium that when executed by one or more computers cause one or more computers as defined by claim 18 wherein said received communications data comprises a discrete first text communication, said plurality of identified k-words comprise a plurality of identified first k-9 words from said received communications data, said plurality of relations comprise a plurality of first relations, wherein said first communication is communicated from a first of the participants, and wherein the program instructions when executed further cause the one or more computers to: receive a plurality of additional discrete text communications from the participants;
 display each of said additional discrete text communications; analyze frequency of occurrence and placement of words and phrases in each of said additional discrete text communications to identify a plurality of identified second k-words and second relations in each of said additional discrete text communications, at least one of said second relations in each of said additional discrete text communications linking to at least one of said identified second k-words in another of said additional discrete text communications, at least one of said second relations linking to one of said identified first k-words; and,
 display in a single graph said first and identified second k-words and said first and second relations.

20. A computer program product for performing a collaboration between a plurality of participants over a data network, the program product comprising computer executable instructions stored in a non-transitory computer storage medium that when executed by one or more computers cause one or more computers as defined by claim 18 wherein the program instructions cause the one or more computers to:
 display said received communications data in a first part of a screen and display said identified k-words and relations in said graphical format in a second part of said screen.

21. A computer program product for performing a collaboration between a plurality of participants over a data network, the program product comprising computer executable instructions stored in a non-transitory computer storage medium that when executed by one or more computers cause one or more computers as defined by claim 18 wherein the program instructions when executed further cause the one or more computers to perform the step of performing a search on a selected term after receiving a search command.

22. A computer program product for performing a collaboration between a plurality of participants over a data network, the program product comprising computer executable instructions stored in a non-transitory computer storage medium that when executed by one or more computers cause one or more computers as defined by claim 18 wherein the program instructions cause the one or more computers to identify said plurality of k-words and relations and to display said identified k-words and said relations in said graphical format in response to a command received from a user.

23. A computer program product for performing a collaboration between a plurality of participants over a data network, the program product comprising computer executable instructions stored in a non-transitory computer storage medium that when executed by one or more computers cause one or more computers as defined by claim 18 wherein the program instructions cause the one or more computers to display said identified k-words and said relations in substantially real-time as said communications are received.

24. A computer program product for performing a collaboration between a plurality of participants over a data network, the program product comprising computer executable instructions stored in a non-transitory computer storage medium that when executed by one or more computers cause one or more computers as defined by claim 18 wherein said received communications data comprises primary data being communicated over the data network from a source external to said network, said identified k-words comprise primary k-words, said relations comprise primary relations, and wherein the computer program instructions when executed further cause the one or more computers to:

display said primary k-words and said primary relations in said graphical format on a first portion of a screen;
　　receive a plurality of discrete secondary text communications being communicated between the participants over the data network;
　　use a text analysis tool to identify secondary k-words and secondary relations in each of said discrete secondary text communications and to identify linking relations that link at least a portion of said identified secondary k-words from each of said discrete secondary text communications to at least one identified secondary k-word from another of said discrete secondary text communications; and,
　　display on a second portion of said screen said identified secondary k-words and secondary relations from each of said discrete secondary text communications and said linking relations over the network to the participants.

25. A computer program product for performing a collaboration between a plurality of participants over a data network, the program product comprising computer executable instructions stored in a non-transitory computer storage medium that when executed by one or more computers cause one or more computers as defined by claim 18 wherein the program instructions when executed further cause the one or more computers to perform the steps of communicating a solution set to a plurality of individuals over the data network for evaluation, and communicating evaluation data from the plurality of individuals to the plurality of participants over the data network.

26. A computer program product for performing a collaboration between a plurality of participants over a data network, the program product comprising computer executable instructions stored in a non-transitory computer storage medium that when executed by one or more computers cause one or more computers as defined by claim 18 wherein the program instructions cause the one or more computers to:

communicate a solution set formulated using said identified k-words over the data network to one or more evaluators for evaluation;
　　receive evaluation data over the data network from said one or more evaluators;
　　display said evaluation data over the data network to the plurality of participants in substantially real time;
　　use said evaluation data to determine whether completion criteria are met;
　　apply at least one genetic operator to said solution set to generate a new solution set if said completion criteria have not been met; and,
　　repeat the steps of communicating said solution set for evaluation, receiving evaluation data, displaying evaluation data, determining whether completion criteria are met, and formulating a new solution set until said completion criteria are met.

27. A computer program product for performing a collaboration between a plurality of participants over a data network, the program product comprising computer executable instructions stored in a non-transitory computer storage medium that when executed by one or more computers cause one or more computers as defined by claim 18 wherein the program instructions when executed further cause the one or more computers to perform a step of using chance discovery to identify one or more of said k-words and one or more of said relations.

28. The method of claim 1, wherein said using a text analysis tool extracts concepts from said received communications data.

\* \* \* \* \*

UNITED STATES PATENT AND TRADEMARK OFFICE
CERTIFICATE OF CORRECTION

| | | |
|---|---|---|
| PATENT NO. | : 7,904,512 B2 | Page 1 of 1 |
| APPLICATION NO. | : 11/119636 | |
| DATED | : March 8, 2011 | |
| INVENTOR(S) | : Goldberg et al. | |

It is certified that error appears in the above-identified patent and that said Letters Patent is hereby corrected as shown below:

In the Drawings:

Sheet 6, FIG. 11    In box 224, please delete "EVLUATION" and insert --EVALUATION-- in its place.

Signed and Sealed this

Sixteenth Day of August, 2011

David J. Kappos
*Director of the United States Patent and Trademark Office*